US006537464B1

(12) United States Patent
Shultes, III et al.

(10) Patent No.: US 6,537,464 B1
(45) Date of Patent: Mar. 25, 2003

(54) MID-BASICITY ALUMINUM COMPOUNDS AND METHODS OF MAKING

(75) Inventors: Benjamin Shultes, III, Liverpool, NY (US); Karen Elizabeth Ruehl, Ballwin, MO (US); Teresa Antoinette Kristoff, Liverpool, NY (US); Nicole Marie Gasiorowski, Syracuse, NY (US)

(73) Assignee: General Chemical Corporation, Parsippany, NJ (US)

( * ) Notice: Subject to any disclaimer, the term of this patent is extended or adjusted under 35 U.S.C. 154(b) by 0 days.

(21) Appl. No.: 09/999,468

(22) Filed: Oct. 31, 2001

(51) Int. Cl.[7] .............................. C02F 1/52; C02F 5/02; C02F 5/08
(52) U.S. Cl. .................. 252/175; 210/716; 252/181
(58) Field of Search ................................ 252/175, 181; 423/600

(56) References Cited

U.S. PATENT DOCUMENTS

| | | | | |
|---|---|---|---|---|
| 3,497,459 A | | 2/1970 | Nakamura et al. | |
| 3,929,666 A | | 12/1975 | Alba et al. | 210/716 X |
| 4,051,028 A | * | 9/1977 | Fiessinger | 252/175 X |
| 4,390,445 A | | 6/1983 | Gytel | 252/175 |
| 4,435,308 A | | 3/1984 | Thomas et al. | 252/181 |
| 4,655,934 A | * | 4/1987 | Rose et al. | 252/175 X |
| 4,826,606 A | * | 5/1989 | Becker et al. | 252/175 X |
| 4,902,779 A | * | 2/1990 | Waldmann | 252/181 X |
| 5,597,510 A | * | 1/1997 | Danda et al. | 252/175 |
| 5,938,970 A | * | 8/1999 | Reilly, Jr. et al. | 252/175 |
| 5,985,234 A | | 11/1999 | Dulko | 423/467 |

* cited by examiner

Primary Examiner—Richard D. Lovering
(74) Attorney, Agent, or Firm—Arthur J. Plantamura

(57) ABSTRACT

A method of making poly aluminum chloride water treatment products comprising reacting an aluminum compound with a base at a temperature in the range of about 70 to 250° F., measuring the aluminum oxide content and adding water to the reaction product as needed to prepare a product having an aluminum oxide content of about 10 percent by weight of the solution.

5 Claims, No Drawings

MID-BASICITY ALUMINUM COMPOUNDS AND METHODS OF MAKING

This invention relates to poly aluminum chloride products useful for all types of water treatment, and to methods for making. More particularly, this invention relates to poly aluminum chloride products having a mid-range basicity that are used in water treatment applications.

BACKGROUND OF THE INVENTION

Poly aluminum chloride is used for water treatment to reduce turbidity, to remove color, to reduce TOC, to reduce filtering rates and the like. This material is a coagulant that produces a floc in water that settles out of solution. This floc traps various impurities and particles found in water, as well as removing color-forming bodies. The present commercial products are used to treat potable water, waste water, for paper treatment and sizing, for food industries and the like.

It would be highly desirable to develop a low cost process manufacturing process that can be carried out in existing aluminum sulfate facilities, and that produces an improved product in terms of basicity, cost and efficiency at lowering turbidity at low doses of product.

SUMMARY OF THE INVENTION

Various methods for making mid-basicity poly aluminum chlorides have been developed. Aluminum trihydrate can be reacted with hydrochloric acid or aluminum chloride; aluminum chloride can be reacted with an acid or a base, including calcium hydroxide or hydrated lime, sodium carbonate, acetic acid, citric acid, sodium hydroxide and sodium aluminate. When a small amount of phosphoric acid is added to aluminum chloride with a base such as hydrated lime as the co-reactant, the solubility of the lime is improved and, unexpectedly, performance of the product in terms of reducing settled and filtered turbidities at minimum dosage levels, is also improved.

The methods used to prepare the poly aluminum chloride products of the invention can be described broadly in terms of whether an external heat source is required to initiate or maintain a reaction or not. Both methods are successful.

However, when an external heat source is not required, the costs of making the water treatment product of the invention are reduced considerably.

DETAILED DESCRIPTION OF THE INVENTION

The method of the invention requires only stirring together an aluminum compound, such as aluminum trihydrate or aluminum chloride, and an acid or base, at a temperature between about 70–250° F. The reaction product is cooled and filtered, and the aluminum oxide content measured. The product solution is then diluted with water, if necessary in order to make a product solution that contains from about 9.8 to 11.0% by weight, e.g., about 10% by weight, of aluminum oxide and has about 30 to about 50% basicity.

The preferred method of the invention is a reaction of from 82 to about 92 weight percent, preferably about 86 to 89% by weight, of aluminum chloride and about 6 to 12% by weight, and preferably about 8 to 10 percent by weight of hydrated lime. Calcium hydroxide and hydrated lime are used interchangeably in this application. The preferred method is an exothermic reaction and thus no additional heat is required for reaction to occur. We have also found that the addition of small amounts, i.e., about 1 to 4% by weight and preferably 2–2.5% by weight of the mixture of phosphoric acid as an 85% by weight solution, solubilizes the hydrated lime, thus reducing the reaction time. The hydrated lime is added slowly to maintain the temperature at a uniform level. The reacted materials are stirred together while maintaining suitable temperatures, and filtered. This is a rapid, low cost method; the starting materials are inexpensive and readily available; the reaction time is generally less than three hours, and no external heat source is required. Unexpectedly, we have also found that this product can be used at low dosages to remove turbidity or other contaminants from water or aqueous solutions; thus the product is highly efficient for forming floc and removing fine particles from water. In general, what is desired is an inexpensive product that can be used to treat water using low doses, i.e., between 2–80 ppm of product, resulting in a turbidity level after settling of below 2.5. Other products on the market can do that, but they generally are much more expensive to produce, are not as stable, and may require special handling procedures.

In a preferred method, a mixture of 82 to 92% by weight of aluminum chloride, 6–12% by weight of hydrated lime and 1–4% by weight of 85% phosphoric acid is prepared. The hydrated lime and phosphoric acid are added at the same time. The mixture is stirred for 2–3 hours and filtered through a 1–5 micron size filter to remove any undissolved hydrated lime or insoluble particles. Hydrated lime is added slowly to the aluminum chloride while monitoring the temperature so as to prevent any sharp increases in temperature; no external heat source is required to maintain the reaction. The phosphoric acid is added with the hydrated lime to help solubilize it and to reduce the amounts of undissolved hydrated lime in the reaction mixture. This also aids in keeping the temperature of the reaction mixture uniform and provides a product of comparable and/or superior performance as compared to other commercially available competitive products of a similar type.

The resultant product can be used to treat all types of water, including potable and waste waters, water used in paper manufacture and sizing, and water used in the food industries, as examples, to remove particles and color-forming bodies, to reduce turbidities, TOC and to increase filtering capacities.

In particular, we have found that the most preferred method of the invention is to react aluminum chloride and calcium hydroxide (hydrated lime) together with phosphoric acid.

After forming the product solutions, the aluminum oxide content is measured. The solutions can be diluted with water as required to obtain an aqueous product solution having a basicity of from about 38.5% to about 50%, and an aluminum oxide content of about 10%. By "about 10%" is meant a range of aluminum oxide of from about 9 to 11%. The product can be further diluted with respect to aluminum as market requirements dictate.

The simplicity of the present processes, and their low cost starting materials, produces a low cost product that cleans water efficiently by lowering turbidity levels at low product dosage levels, and increasing filtering capacities.

The invention will be further described in the following examples; however, the invention is not meant to be limited to the details described therein.

COMPARATIVE EXAMPLE 1

1521.3 grams of 22° Baumé hydrochloric acid and 860.3 grams of aluminum trihydrate were mixed and stirred for about 6 hours. The temperature was maintained at about 225° F. from an external heat source. Water was added to yield a 10.7% aluminum oxide content product.

COMPARATIVE EXAMPLE 2

2035 Grams of aluminum chloride was mixed with 860 grams of aluminum trihydrate and stirred for 4 to 8 hours while maintaining the temperature with an external heat source at about 225° F. The resultant solution was diluted to obtain a product containing a 10% solution of aluminum oxide. The basicity of the product solution was about 30–35%.

COMPARATIVE EXAMPLE 3

Mixtures of aluminum chloride, aluminum trihydrate and hydrochloric acid were stirred for 3 hours and filtered. The product had a 10.2% aluminum oxide content and a basicity of 31%.

COMPARATIVE EXAMPLE 4

This example repeats Comparative Example 2 but at a lower temperature. 1521.3 grams of hydrochloric acid and 860.3 grams of aluminum hydrate were stirred together while maintaining the temperature at 200° F. for about 20 minutes. The temperature was then raised to 240° F., the mixture stirred for about 8 hours total time, and let stand overnight.

The product had an aluminum oxide content of 19.23% after dilution to 10.71% as aluminum oxide.

EXAMPLE 1

No external heat source is required for the method of this Example.

A mixture of 500 grams of aluminum chloride and 52 grams of hydrated lime (as calcium hydroxide) was stirred for about 3 hours and then filtered. The hydrated lime is added at a rate so that the temperature does not rise rapidly. The resultant product has an aluminum oxide strength of about 10.2%, when the basicity was 47%. This method does not require an external heat source, and the reaction is rapid.

EXAMPLE 2

Four mixtures of 600 grams each of aluminum chloride and 52 grams of hydrated lime as calcium hydroxide were prepared. Phosphoric acid was added in amounts of 1, 2, 3, and 4% by weight respectfully to the four solutions to help solubilize the hydrated lime, at a rate so as to maintain a uniform temperature. The mixture was stirred for two hours and filtered. This is an inexpensive and rapid method of making the products of the invention.

EXAMPLE 3

A mixture of 500 grams of aluminum chloride and 75 grams of sodium carbonate was stirred for 3 hours and filtered. This produced an exothermic reaction and no external heat source was required. The product yield was 10.5% aluminum oxide and 29% basicity.

EXAMPLE 4

A mixture of 500 grams of aluminum chloride and 28.5 grams of 50% sodium hydroxide were stirred for 3 hours and filtered. The resultant product had a 10.5% aluminum oxide content and was 30% basic.

EXAMPLE 5

A mixture of aluminum chloride and sodium aluminate was stirred for 3 hours and filtered. The aluminum oxide strength of the product was 10.5% and was a 45% basic solution. This method is rapid and does not require an external heat source, thereby lowering the costs of manufacture.

EXAMPLE 6

Mixtures of aluminum chloride, aluminum trihydrate and hydrated lime were mixed for 3 hours and filtered. The product had a 10.5–13.5% aluminum oxide content and 30–35% basicity.

EXAMPLE 7

Mixtures of aluminum chloride, hydrated lime, phosphoric acid and a polymer, such as epichlorohydrin or dimethyldiallylammonium chloride, were mixed for 3 hours and filtered. The product had an aluminum oxide content of 9.9% and had a basicity of 40–47%.

The dosage of the product in parts per million (ppm) and the turbidity of treated waters, taken from various sites designated A through G, was measured and compared to various commercially available products, designated as 1 through 4. The results are summarized below. A settled turbidity of under 2.5 is considered to be good. The lower the turbidity, the better the performance of the product.

| Site | Dosage, ppm | Settled Turbidity of products of the Invention | Commercial products Product | Settled Turbidity |
|---|---|---|---|---|
| A | 20 | 2.2 | 1* | 2.38 |
|   | 40 | 0.94 |   | 1.58 |
| B | 15 | 0.419 | 2** | 0.427 |
|   | 20 | 0.393 |   | 0.4 |
|   | 25 | 0.38 |   | 0.395 |
| C | 15 | 2.95 | 2 | 1.8 |
|   | 18 | 1.70 |   | 1.71 |
|   | 21 | 1.5 |   | 1.2 |
| D | 20 | 1.41 | 1 | 1.15 |
|   | 30 | 1.26 |   | 1.38 |
|   | 40 | 1.28 |   | 0.95 |
|   | 20 | 1.41 | 3*** | 2.09 |
|   | 30 | 1.26 |   | 1.45 |
|   | 40 | 1.20 |   | 1.20 |
| E | 20 | 0.55 | 4**** | 0.86 |
|   | 25 | 0.37 |   |   |
|   | 30 | 0.31 |   |   |
|   | 35 | 0.27 |   |   |
| F | 70 | 3.49 |   |   |
| G | 5 | 1.80 | 1 | 2.10 |
|   | 10 | 0.92 |   | 0.98 |
|   | 15 | 0.60 |   | 0.68 |
|   | 5 | 1.80 | 3 | 1.90 |
|   | 10 | 0.92 |   | 0.92 |

*"Stern-Pac" of Sternson Co, of Ontario Canada
**"Del-Pac 2500" of Delta Chemical Co. of Baltimore, MD
***"HI-2021" of General Chemical Corporation, Syracuse, NY
****"Delta 812" of Delta Chemical Co.

Comparing settled turbidity of various water samples at comparable dosage levels of product, the present products in most instances have equivalent or lower turbidity than other commercially available products. The present products are more stable, are easier to produce and are more cost efficient.

Although the present invention has been explained in terms of specific embodiments, the invention is meant to include other embodiments, as explained hereinabove, and the invention is not meant to be limited except by the scope of the appended claims.

We claim:

1. A method of making a poly aluminum chloride water treatment product comprising:
   a. reacting from about 82 to about 92 weight percent of an aluminum compound with from about 6 to about 12 weight percent of a base selected from the group consisting of hydrated lime, sodium hydroxide, sodium carbonate and sodium aluminate at a temperature of about 70 to 250° F.; and
   b. adding water in amounts sufficient to make a product solution containing about 10% by weight of aluminum oxide and having a mid-range basicity of from about 38.5 to 50 percent.

2. A method according to claim 1 wherein said base is calcium hydroxide.

3. A method according to claim 2 wherein from 1–4% by weight of phosphoric acid based on the weight of the base and having a concentration of about 85% is added to solubilize said calcium hydroxide.

4. A method of preparing an aluminum-containing water treatment product comprising reacting from about 82 to 92 weight percent of aluminum chloride with from 6–12 weight percent hydrated lime and from 1 to 4% by weight of phosphoric acid to solubilize the hydrated lime, maintaining the temperature at from about 70 to 250° F., measuring the aluminum oxide content, and adding water to the reaction product in amounts sufficient to provide a basicity of from about 38.5 to about 50 percent and to bring the aluminum oxide content to about 10% by weight of the solution.

5. A method of preparing an aluminum-containing water treatment product having a basicity of from about 38.5 to about 50 percent comprising:

reacting from about 82 to 89 weight percent of aluminum chloride, with from about 8 to 12 weight percent hydrated lime and from 1 to 4% by weight of phosphoric acid to solubilize the lime, maintaining the temperature at from about 70 to 250° F., measuring the aluminum oxide content, and adding water to the reaction product in amounts sufficient to provide said basicity and to bring the aluminum oxide content to about 10% by weight of the solution.

* * * * *